(12) United States Patent
Rossiquet et al.

(10) Patent No.: US 9,388,084 B2
(45) Date of Patent: Jul. 12, 2016

(54) PRODUCT MADE OF DENSE SILICON CARBIDE

(71) Applicants: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

(72) Inventors: Gilles Rossiquet, Louzac Saint-Andre (FR); Eric Jorge, Les Valayans (FR)

(73) Assignees: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/397,406

(22) PCT Filed: Apr. 15, 2013

(86) PCT No.: PCT/FR2013/050814
§ 371 (c)(1),
(2) Date: Oct. 27, 2014

(87) PCT Pub. No.: WO2013/160581
PCT Pub. Date: Oct. 31, 2013

(65) Prior Publication Data
US 2015/0111718 A1    Apr. 23, 2015

(30) Foreign Application Priority Data
Apr. 27, 2012 (FR) .................................... 12 53916

(51) Int. Cl.
*C04B 35/565* (2006.01)
*C04B 35/573* (2006.01)
*C04B 35/575* (2006.01)
*C04B 35/626* (2006.01)

(52) U.S. Cl.
CPC ............ *C04B 35/565* (2013.01); *C04B 35/573* (2013.01); *C04B 35/575* (2013.01); *C04B 35/62625* (2013.01); *C04B 35/62695* (2013.01); *C04B 2235/3217* (2013.01); *C04B 2235/3225* (2013.01); *C04B 2235/666* (2013.01)

(58) Field of Classification Search
CPC .. C04B 35/565; C04B 35/573; C04B 35/575; C04B 35/5755
See application file for complete search history.

(56) References Cited

U.S. PATENT DOCUMENTS 5,591,685 A * 1/1997 Mitomo ................ C04B 35/575
                                                      501/88
6,531,423 B1 * 3/2003 Schwetz ............... C04B 35/575
                                                      501/89

FOREIGN PATENT DOCUMENTS

EP        1070686        * 1/2001
JP      2001080964       * 3/2001

OTHER PUBLICATIONS

L. K. L. Falk, "Microstructural Development during Liquid Phase Sintering of Silicon Carbide Ceramics", Journal of the European Ceramic Society, vol. 17, No. 8, pp. 983-994, (Jun. 1, 1997) XP004063926.
Lena K. L. Falk, "Electron Spectroscopic Imaging and Fine Probe EDX Analysis of Liquid Phase Sintered Ceramics", Journal of the European Ceramic Society, vol. 18, No. 15, pp. 2263-2279, (Dec. 1, 1998) XP055048005.
E. Gomez, et al., "Liquid phase sintering of SiC with additions of $Y_2O_3$, $Al_2O_3$ and $SiO_2$", Journal of the European Ceramic Society, vol. 24, No. 9, pp. 2895-2903, (Aug. 1, 2004) XP027107183.
D. Sciti, et al., "Effects of additives on densification, microstructure and properties of liquid-phase sintered silicon carbide", Journal of Materials Science, vol. 35, No. 15, pp. 3849-3855, (Aug. 1, 2000) XP001065318.
Gert Roebben, et al., "High-Temperature Stiffness and Damping Measurements to Monitor the Glassy Intergranular Phase in Liquid-Phase-Sintered Silicon Carbides", Journal of the American Ceramic Society, vol. 88, No. 8, pp. 2152-2158, (Aug. 1, 2005) XP055048011.
M. Herrmann, et al., "Micro-segregations in liquid phase sintered silicon carbide ceramics", Journal of the European Ceramic Society, vol. 30, No. 6, pp. 1495-1501, (Apr. 1, 2010) XP026892980.
International Search Report Issued Jul. 5, 2013 in PCT/FR13/050814 Filed Apr. 15, 2013.

* cited by examiner

*Primary Examiner* — Karl Group
(74) *Attorney, Agent, or Firm* — Oblon, McClelland, Maier & Neustadt, L.L.P.

(57) ABSTRACT

Sintered product exhibiting a relative density of greater than 97% and composed of:
more than 92% by weight of silicon carbide,
between 0.5% and 8% by weight of an amorphous secondary phase comprising the elements O, Si and one or two elements chosen from Al and Y,
less than 2% of other elements, present in said product in the form of an additional phase or of unavoidable impurities,
in which the silicon carbide is present in the form of crystalline grains and in which said secondary phase is amorphous and located essentially at the boundaries of the silicon carbide grains.

19 Claims, No Drawings

PRODUCT MADE OF DENSE SILICON CARBIDE

The invention relates to a dense product based on silicon carbide which can in particular be used for its abrasion-resistance properties, in particular properties of resistance to abrasion by impact (also known in the field as impact wear).

When the wear of a product subjected to abrasion is considered, sliding wear and impact wear are singled out in the field.

Sliding wear consists of wear generated by the tangential friction of abrasive particles confined in an environment. It is normally demonstrated by tests according to the standard ASTM G76-04 with a tangential angle of incidence at the surface of the sample to be tested.

The impact wear or impact erosive wear or also erosion by solid particles impingement consists of wear generated by free abrasive particles. It is usually demonstrated by a test according to the standard ASTM G76-04 with an angle of incidence of the abrasive particles this time of approximately 90°.

These stresses refer thus to and require very different properties of the product.

In particular, the products used for their good resistance to sliding wear are not necessarily equally effective in a use requiring resistance to impact wear. They thus cannot, a priori, be used directly to reduce impact wear, and vice versa.

It is known that silicon carbide products exhibit a good resistance to impact wear. However, for economic reasons, the conditions of use are stressing said products in an increasingly significant manner, in particular in equipment in which the materials used are subjected to high abrasion by hard divided materials, such as rocks, gravel or grains, in a liquid or nonliquid medium. There thus exists a need for a silicon carbide product exhibiting a yet improved resistance to impact wear.

One aim of the invention is to meet such a need.

The publication "Microstructural design of sliding-wear-resistant liquid-phase-sintered SiC: An overview", Borrero-Lopez et al., Journal of the European Ceramic Society, 27 (2007), pp. 3351-3357, describes the use of an yttrium aluminum oxide to densify silicon carbide particles by a sintering reaction in the liquid state. According to the teaching of this publication, in particular the photographs of the microstructure given in FIG. 1, a crystalline phase of the oxide is present between the SiC grains in the final product. It is indicated that such a product exhibits properties of resistance to sliding abrasion. No information is provided in this publication with regard to the impact resistance properties of such materials.

The publication of the review Ceramics International, 19, pages 347-351 (1993), describes a process for the densifying of SiC products by the HIP (High Isostatic Pressure) technique in the presence of amounts of oxide liquid phases which range up to 5% by weight.

According to the data given in FIG. 1 of this publication, and by recalculating the theoretical value of the absolute density of each material (by taking into account its composition), it is possible to calculate the following relative densities:

| % $Al_2O_3$ | Density (g/cm³) (according to the publication) | Relative density (%) (calculated) |
|---|---|---|
| 1 | 3.09 | 96.0% |
| 2 | 3.11 | 96.5% |
| 3 | 3.12 | 96.6% |
| 5 | 3.13 | 96.5% |

The conditions of the HIP process which are described in this publication appear very severe, both in pressure and in temperature: 200 MPa, 1850° C. (see p. 348, middle of $1^{st}$ column). However, it is seen that the relative density of the sample obtained by such a process still remains less than 97%, whatever the percentage of oxide phase introduced.

According to a first aspect, the present invention relates to a sintered product exhibiting a relative density of greater than 97% and composed of:
  more than 92% by weight of silicon carbide,
  between 0.5% and 8% by weight of an amorphous secondary phase comprising the elements O, Si and one or two elements chosen from Al and Y,
  less than 2%, in total, of other elements, present in said product in the form of an additional phase or of unavoidable impurities,
in which the silicon carbide is present in the form of crystalline grains advantageously exhibiting a mean size of less than 3 micrometers and in which said secondary phase is amorphous and located essentially at the boundaries of the silicon carbide grains.

The term "relative density of a product" is understood to mean the ratio equal to the bulk density divided by the absolute density, expressed as percentage.

The term "bulk density of a product" is understood to mean, within the meaning of the present invention, the ratio equal to the weight of the product divided by the volume occupied by said product.

The term "absolute density of a product" is understood to mean, within the meaning of the present invention, the ratio equal to the weight of dry matter of said product, after a grinding to a fineness such that substantially no closed porosity remains, divided by the volume of this weight after grinding. It can be measured by helium pycnometry.

The term "amorphous" is understood to mean, within the meaning of the present invention, that no crystallization peak characteristic of the phase present at the grain boundary appears on an X-ray diffractogram carried out on a powder of said product, even after an acquisition time of several hours. In addition, the amorphous nature of the secondary phase can also, in particular for the lowest concentrations of said secondary phase (typically less than 1% by weight), be demonstrated by observation with a transmission electron microscope (TEM) by the following method: at least 10 samples of the product to be characterized are removed randomly and prepared for observation with a transmission electron microscope by the "petrographic" technique. A modification to the orientation (or tilt) of the sample makes it possible to demonstrate the amorphous nature of said second phase, if it does not change in contrast (no diffraction contrast) during the changes in orientation, with respect to the incident electron beam. On the contrary, a crystalline phase changes in contrast (diffraction contrast) during the tilt, for example changing from light gray to black.

The term "mean size of the silicon carbide grains in the sintered part" is understood to mean the mean of the dimensions measured according to the intercept length method described in the standard ASTM E1382-97, or average intercept length, the results obtained by this standard being multiplied by a correcting coefficient equal to 1.56 in order to take into account the three-dimensional aspect. The amount of amorphous secondary phase is determined by chemical analysis, coupled with microprobe observations.

Preferably, the sintered product according to the invention comprises at least one of the following optional characteristics, which can, of course, if appropriate, be combined with one another:

The relative density of the product is greater than 97.5%, preferably greater than 98%, preferably greater than 98.5%, preferably greater than 99%, indeed even greater than 99.5%, indeed even greater than 99.7%.

The silicon carbide represents more than 93%, preferably more than 94%, of the weight of the product according to the invention.

The silicon carbide represents less than 98%, preferably less than 96%, of the weight of the product according to the invention.

The amount of amorphous secondary phase is greater than 1%, preferably greater than 2%, preferably greater than 3% or 4% and/or less than 7%, preferably less than 6%, of the weight of the product according to the invention.

In one embodiment, the amorphous secondary phase comprises Al and Si and O, in particular in the form of an amorphous oxide of aluminum and silicon. In such a configuration, sintering by SPS, as described in the continuation of this description, is advantageously used.

In another embodiment, the amorphous secondary phase comprises Y and Si and O, in particular in the form of an amorphous oxide of yttrium and silicon. In such a configuration, sintering by SPS, as described in the continuation of this description, is advantageously used.

In another embodiment, the amorphous secondary phase comprises Y, Si, Al and O, in particular essentially in the form of an amorphous oxide of yttrium, aluminum and silicon. The term "essentially" is understood to mean, according to the present invention, that the secondary phase is composed, for more than 80% of its weight, preferably for more than 90% of its weight, preferably for more than 95% of its weight, preferably for more than 98% of its weight, indeed even for more than 99% of its weight, of the sole elements Al, Y, Si and O. According to this embodiment, in the amorphous secondary phase and on the basis of the amounts of the elements as initially introduced, the Si/(Al+Y) atomic ratio is advantageously less than 1.6, preferably less than 1.5. According to this embodiment, also advantageously, the Y/Al molar ratio in the amorphous secondary phase is between 0.4 and 3.5, in particular between 0.4 and 2. Very preferably, the Y/Al molar ratio in the amorphous secondary phase is between 0.4 and 0.8, preferably between 0.5 and 0.7.

In one embodiment, the product according to the invention comprises less than 1.5%, preferably less than 1%, preferably less than 0.5%, indeed even less than 0.3%, indeed even less than 0.1%, in total, of other elements.

In one embodiment, the other elements consist of impurities.

In one embodiment, the product according to the invention exhibits fewer than two free carbon inclusions over a surface area equal to 4 $\mu m^2$, preferably fewer than one free carbon inclusion, preferably no free carbon inclusion, said inclusions being located between the silicon carbide grains. In one embodiment, the free carbon exists in the form of graphite. The term "inclusion of an element" is understood to mean an assembly of one or more particles of said element, said assembly exhibiting a size of greater than 80 nm.

The abrasion of the product by impact, as measured according to the standard ASTM G76-04 with an angle of incidence of 90°, is less than 0.2 $mm^3/g$, preferably less than 0.1 $mm^3/g$ and very preferably less than 0.05 $mm^3/g$.

The mean size of the grains is less than 2 μm, preferably less than 1 μm, preferably less than 800 nm, preferably less than 700 nm, preferably less than 600 nm and/or preferably greater than 100 nm, preferably greater than 200 nm, preferably greater than 250 nm.

The Vickers HV1 hardness of the product, measured at 1 kg, is greater than 2200 MPa, preferably greater than 2300 MPa, indeed even greater than 2400 MPa.

The toughness of the product is greater than 3 MPa preferably greater than 3.5 $MPa \cdot m^{1/2}$, indeed even greater than 4 $MPa \cdot m^{1/2}$, indeed even greater than 5 $MPa \cdot m^{1/2}$.

The product is provided in the form of a part, all the dimensions of which are greater than 5 mm, indeed even 8 mm, indeed even 10 mm and/or the volume of which is greater than 50 $cm^3$, indeed even 60 $cm^3$.

The product according to the invention can, of course, also comprise impurities. The term "impurities" is understood to mean the unavoidable constituents unintentionally and necessarily introduced with the starting materials or resulting from reactions with these constituents. The impurities are not necessary constituents but only tolerated constituents.

The invention also relates to a process for the manufacture of a sintered product as claimed in one of the preceding claims, comprising the following successive stages:

a) preparation of a slip comprising:
   a solvent,
   a surface-active agent,
   optionally an acid and/or a base,
   more than 4%, as percentage by weight on the basis of the slip, of a mixture of powders comprising a silicon carbide powder and a powder of an oxide of at least one element chosen from Al and Y, the median size of the particles of the silicon carbide powder being less than 2 μm and the median size of the particles of the oxide powder being less than that of the silicon carbide powder, it being possible for the oxide powder to be replaced with a powder of precursor of said oxide, b) optionally casting the slip in a mold, c) freezing the slip, so as to form a preform comprising ice crystals separated by walls, said walls comprising said mixture of silicon carbide powder and powder of said oxide or precursor of said oxide, d) optionally withdrawing said frozen slip preform from the mold, e) removing the ice crystals from said frozen slip preform, optionally withdrawn from the mold, preferably by sublimation, so as to obtain an assembly of agglomerates, f) optionally grinding (breaking up) and/or sieving the assembly of agglomerates, so as to obtain a powder, g) sintering the powder by SPS (Spark Plasma Sintering), the shaping of the product being carried out during this stage, so as to obtain a product according to the invention.

For example, a process according to the invention comprises at least one of the following characteristics, which can, of course, be combined with one another:

the powder of an oxide of at least one element chosen from Al and Y is a YAG ($Y_3Al_5O_{12}$) powder, the powder of an oxide of at least one element chosen from Al and Y is mixed with a silica powder or silica precursor powder, the median size of which is less than that of the silicon carbide powder.

Preferably, stage a) comprises at least one of the following characteristics, which can, of course, be combined with one another:
- the solvent comprises more than 50% by weight of water and preferably the solvent is water,
- the silicon carbide powder exhibits a median particle size of less than 1.5 μm, preferably of less than 1 μm, preferably of less than 0.8 μm, preferably of less than 0.6 μm and/or of greater than 50 nm, preferably of greater than 100 nm, indeed even of greater than 200 nm,
- the silicon carbide powder exhibits a content of silicon carbide by weight of greater than 95%, preferably of greater than 98%, preferably of greater than 99%,
- the silicon carbide powder exhibits a content of oxygen (O) element of greater than 0.1%, preferably of greater than 0.3%, preferably of greater than 1%, and the silicon carbide powder exhibits a content of oxygen element of less than 6%, preferably of less than 5%, preferably of less than 4%, preferably of less than 3%, indeed even of less than 2%,
- the YAG, YAG precursor, silica or silica precursor powders exhibit a median particle size of less than 1.2 times the median particle size of the silicon carbide powder, preferably of less than 1.4 times, indeed even of less than 1.6 times, or even very preferably of less than 1.8 times the median particle size of the silicon carbide powder,
- the YAG powder or YAG precursor powder comprises less than 2% by weight of impurities, preferably less than 1% of impurities, preferably less than 0.5% of impurities, indeed even less than 0.2% of impurities,
- a YAG powder is used and the slip does not comprise YAG precursor. Advantageously, the homogeneity of the dispersion of the elements Y and Al in the second amorphous phase is thereby improved,
- the slip does not comprise silica powder,
- the slip comprises more than 5% by weight of mixture of powders, preferably more than 10% by weight, preferably more than 20% by weight, preferably more than 30% by weight, preferably more than 40% by weight of mixture of powders,
- the slip comprises less than 80% by weight of mixture of powders, more preferably still less than 70% by weight, indeed even less than 60% by weight of mixture of powders,
- the surface-active agent is chosen from anionic surfactants and their mixtures, cationic surfactants and their mixtures, nonionic surfactants and their mixtures, amphoteric surfactants and their mixtures, and their mixtures. Preferably, the surface-active agent is chosen from polyacrylic acids, polymethacrylic acids, polyethyleneimines, tetramethylammonium hydroxide, citric acid, stearic acid, modified polycarboxylates and their mixtures and preferably the surface-active agent is chosen from modified polycarboxylates,
- the surface-active agent is a modified polycarboxylate ether and the amount of modified polycarboxylate ether is greater than 0.01%, preferably greater than 0.025% and less than 1%, preferably less than 0.5%, less than 0.1%, less than 0.05%, less than 0.035%, as percentage by weight on the basis of the weight of the silicon carbide powder,
- the slip does not comprise other components than a solvent, the surfactant, an acid and/or a base and the mixture of powders. In a preferred embodiment, the slip does not comprise a binder,
- the mixture of powders the slip consists of a silicon carbide powder exhibiting a content of oxygen element of between 1% and 2% and a YAG powder.

Preferably, during stage b), the slip is cast in trays, in the form of sheets, preferably with a thickness of less than 10 cm, indeed even of less than 5 cm.

Preferably, stage c) exhibits at least one of the following characteristics, which can be combined, if appropriate, with one another:
- the speed of the solidification front is greater than 1 μm/s, preferably greater than 5 μm/s, indeed even greater than 10 μm/s, indeed even greater than 20 μm/s, indeed even greater than 40 μm/s,
- the speed of the solidification front is less than 400 μm/s, preferably less than 300 μm/s, preferably less than 200 μm/s, preferably less than 100 μm/s,
- the thermal gradient is greater than 10° C./cm, indeed even greater than 20° C./cm,
- the thermal gradient is less than 200° C./cm, indeed even less than 150° C./cm, indeed even less than 100° C./cm.

Preferably, in stage e), the removal of the ice crystals results from a sublimation of these.

Preferably, the powder obtained at the end of stage f) exhibits the following characteristics:
- a median agglomerate size of greater than 3 μm, preferably of greater than 10 μm,
- a median agglomerate size of less than 200 μm, preferably of less than 150 μm, preferably of less than 100 μm, preferably of less than 50 μm,
- a residual moisture content of between 0.2% and 1%, preferably of between 0.2% and 0.6%, as percentages by weight on the basis of the wet powder.

Stage g) is carried out by an SPS sintering technique, the main characteristics of which are given below:
the heating is obtained by virtue of a direct current which passes through a conducting matrix in which the sample is placed and subjected to a uniaxial pressure of several tens of MPa. This device makes it possible to achieve temperatures of the order of 2500° C.

In the SPS installation, series of streams of pulses of direct current (pulse conventionally with a duration of 3 to 4 ms), interspersed by dead times of variable current and voltage, are applied so as to achieve the desired sintering temperature. The conducting matrix acts as source of heating, in addition to the possible conductivity of the sample, which makes it possible to obtain high heating rates (up to 600° C./min and more) and provides good transfer of the heat to the sample. Thus, sintered objects of very high compactness can be obtained by this technique for lower temperatures (a few hundred degrees lower) and in particular significantly shorter sintering times (a few minutes) than for conventional methods for sintering in the solid or liquid state.

Preferably, stage g) exhibits at least one of the following characteristics, which can, of course, be combined with one another:
- the sintering temperature is greater than 1700° C., preferably greater than 1750° C., preferably greater than 1800° C.,
- the sintering temperature is less than 2300° C., indeed even less than 2200° C., indeed even less than 2000° C., indeed even less than 1900° C.

A temperature equal to 1850° C. is highly suitable,
- the pressure applied is greater than 10 MPa, preferably greater than 20 MPa, preferably greater than 35 MPa,
- the pressure applied is less than 500 MPa, preferably less than 300 MPa, indeed even less than 200 MPa, indeed even less than 100 MPa, indeed even less than 75 MPa, indeed even less than 55 MPa, the time for maintaining in the stationary phase at high temperature can be zero. Preferably, this maintenance time is greater than 0.5 minute, preferably greater than 1 minute, preferably greater than 2 minutes, preferably greater than 4 minutes and less than 60 minutes, preferably less than 30 minutes, preferably less than 20 minutes, preferably less than 10 minutes, preferably less than 6 minutes. A sintering time equal to 5 minutes is highly suitable, the rate of rise to the maximum temperature is greater than 20° C./min, indeed even greater than 30° C./min, indeed even greater than 50° C./min, indeed even greater than 100° C./min, the firing takes place under a controlled atmosphere, preferably under vacuum or under argon or under nitrogen.

Unless otherwise indicated, in the present description all the percentages are percentages by weight.

The term "sublimation" describes an operation which consists, generally under vacuum, in changing a product directly from the solid state to the gas state without the involvement of melting.

The size of a particle is given conventionally by a laser particle sizing distribution characterization. A laser particle sizer conventionally makes possible the measurement of the sizes of less than or equal to 5 mm. The term "median size" of an assembly of particles, in particular of a powder, refers to the $D_{50}$ percentile, that is to say the size dividing the particles into first and second populations equal in volume, these first and second populations comprising only particles exhibiting a size respectively greater than or less than the median size. The term "maximum size" of an assembly of particles, in particular of a powder, refers to the $D_{99.5}$ percentile, that is to say the size for which 99.5% by volume of the particles exhibit a smaller size.

"Oriented" freezing is understood to mean a freezing carried out gradually along one or more predetermined directions.

The term "comprising a" is understood to mean "comprising at least one", unless otherwise indicated.

A precursor of a constituent is a compound capable, during a sintering, of resulting in this constituent. The replacement of a constituent by an "equivalent" amount of a precursor of this constituent does not modify the amounts of said constituent in the sintered product obtained.

A more detailed description of advantageous but nonrestrictive embodiments of the process for obtaining the product according to the invention is given below:

In stage a) of preparation of the slip, an aqueous suspension of a mixture of particle powders is prepared. The slip can also comprise a defoamer. Preferably, the content of defoamer is between 0.1% and 10% by weight, on the basis of the amount of mixture of particle powders. The defoamers conventionally used for the manufacture of sintered products by slip casting can be employed, for example the Contraspum Conc. sold by Zschimmer and Schwarz. Preferably, the slip does not comprise a defoamer.

In order to promote good dispersing of the particles of the powder in the slip, the zeta potential can be adjusted, for example by an addition of acid and/or base, which are organic and/or inorganic. Preferably, the different constituents of the slip are added with stirring.

The mixing of the various constituents of the slip can be carried out according to any technique known to a person skilled in the art, for example in a mixer, in a jar mill with beads or balls, preferably made of silicon carbide. If a jar mill is used, the mixing time is preferably greater than 2 hours and less than 48 hours. Preferably, a jar mill is used.

Preferably, the pH is measured between 30 minutes and one hour after the introduction of the final constituent and, if necessary, is adjusted.

In stage b), the slip is preferably cast in a mold suitable for the oriented freezing of the following stage; preferably, the slip is cast in the form of a sheet with a thickness of less than 10 cm, preferably of less than 5 cm.

In stage c), the slip is cooled, so as to freeze the water and to form ice crystals. The slip is gradually frozen, creating and then displacing, in the slip, a region of rapid thermal transition between an upstream region in which the water is frozen and a downstream region in which the water is liquid. Its passage through the slip results in the solidification of the water. This is why it is conventionally described as "solidification front". The creation and the displacement of a solidification front, which are necessary for an oriented freezing of the slip, are techniques commonly used in the field of ice templating. This technology is a specific embodiment of the general process of freeze casting. Preferably, a liquid, in particular liquid nitrogen, is used to create the solidification front.

Preferably, the speed of the solidification front is greater than 1 µm/s, preferably greater than 5 µm/s, preferably greater than 10 µm/s and/or less than 400 µm/s, preferably less than 300 µm/s, preferably less than 200 µm/s, preferably less than 100 µm/s, indeed even less than 50 µm/s, indeed even less than 30 µm/s. At the passing of the solidification front, the new ice crystals become oriented and then grow substantially along the direction of solidification imposed by the thermal gradient.

Preferably, the freezing is oriented.

The size of the ice crystals depends mainly on the speed of displacement of the solidification front and on the thermal gradient associated with this solidification front. The higher the solidification speed, the smaller the size of the ice crystals. The size of the ice crystals can also be modified by the composition of the slip and in particular by the size of the particles of the powder mixture.

Preferably, the process does not exhibit a stage d).

In stage e), the frozen slip preform is placed under pressure and temperature conditions resulting in removal of the ice crystals.

Preferably, the removal results from a sublimation of the ice crystals. The water then changes directly from the solid state to the gas state. Advantageously, the sublimation of the ice crystals makes possible removal of the water substantially without displacement of the particles positioned between these crystals. For example, it is possible to sublime the ice crystals by reheating them at very low pressure, typically of less than 0.5 mbar. It is also possible to melt the ice crystals and to allow the liquid water obtained to flow out. The disappearance of an ice crystal leaves space for a pore delimited by a wall formed mainly by the particles of silicon carbide and of oxide of at least one element chosen from Al and Y, the shape of this pore corresponding substantially to the shape of the crystal removed. Thus, the creation of elongated ice crystals, substantially parallel to one another, results in the creation of tubular pores, also parallel to one another.

Stage e) is continued, preferably until all the ice crystals have been removed.

An assembly of agglomerates is thus obtained.

In stage f), the grinding is carried out by the dry route by any technique known to a person skilled in the art, preferably using a bowl comprising moving bodies (rings, paddles or beads) set in motion or using a pestle and mortar. The sieving is preferably carried out using a sieve with an opening of less than 500 µm, indeed of less than 400 µm. Advantageously, this stage makes it possible to remove the coarsest agglomerates.

In stage g), the powder is poured into the SPS matrix, which is covered internally beforehand with carbon paper. The matrix is subsequently vibrated in order to obtain a good distribution of the powder. The powder can also be precompacted before being inserted into the SPS matrix.

The sintering temperature is greater than 1700° C., preferably greater than 1750° C., preferably greater than 1800° C. and less than 2300° C., indeed even less than 2200° C., indeed even less than 2000° C., indeed even less than 1900° C. A temperature equal to 1850° C. is highly suitable.

The pressure applied is greater than 10 MPa, preferably greater than 20 MPa, preferably greater than 35 MPa and less than 500 MPa, preferably less than 300 MPa, indeed even less than 200 MPa, indeed even less than 100 MPa, indeed even less than 75 MPa, indeed even less than 55 MPa.

The time for maintaining in the stationary phase at a high temperature can be zero. Preferably, this maintenance time is greater than 0.5 minute, preferably greater than 1 minute, preferably greater than 2 minutes, preferably greater than 4 minutes and less than 60 minutes, preferably less than 30 minutes, preferably less than 20 minutes, preferably less than 10 minutes, preferably less than 6 minutes. A sintering time equal to 5 minutes is highly suitable.

The rate of rise to the maximum temperature is greater than 20° C./min, indeed even greater than 30° C./min, indeed even greater than 50° C./min, indeed even greater than 100° C./min.

The firing takes place under a controlled atmosphere, preferably under vacuum or under argon or under nitrogen.

The invention also relates to the use of the product as described above as abrasion-resistant protective part which is resistant to impact wear, within the meaning described above.

In particular, the invention also relates to any installation comprising said product chosen from a hopper, an item of equipment for the transportation or conveying of granular or pulverulent solids, for example by the hydraulic or pneumatic route, in particular a baffle, a chute, a pipe, an item of equipment for comminution under dry conditions or in a wet medium, in particular a mill, an item of equipment for particle size selection, in particular a cyclone, a grinding bead, a fan blade, a dynamic or static particle size selector, in particular a sieve, a spray or injection nozzle, a rotor or stirrer for suspensions, a seal, a pump, a collar or a bearing of a rotating shaft, a valve or a faucet.

The examples which follow are given purely by way of illustration and do not limit, under any of the aspects described, the scope of the present invention.

EXAMPLE 1

Comparative

The product of comparative example 1 is a commercial product made of Hexoloy® SA silicon carbide, sold by Saint-Gobain Ceramics. It is manufactured by natural solid-phase sintering and is commonly used in installations as abrasion-resistant product which withstands wear by impact.

EXAMPLE 2

According to the Invention

The product of example 2 according to the invention is obtained in the following way:

According to the first stage a), a slip is prepared by mixing:
2212 grams of water,
2328 grams of a silicon carbide powder with the commercial reference Starck UF25, exhibiting a specific surface of 25 m$^2$/g, a median particle size equal to 0.43 µm, and a content of oxygen element equal to 1.7% by weight and comprising more than 99% of silicon carbide,
122.5 grams of a YAG ($Y_3Al_5O_{12}$) powder, sold by Baikowski, exhibiting a median particle size equal to 0.18 µm and a content of $Y_3Al_5O_{12}$ of greater than 99.5%. The weight of the YAG powder represents 5% of the total weight of the mixture (silicon carbide powder and YAG powder),
0.88 gram of a dispersant (Castament FS10, sold by BASF), i.e. 0.038% of the weight of the silicon carbide powder.

The solids content is equal to 50% of the weight of the slip. The pH of the slip is adjusted to 11.5 by an addition of 1M sodium hydroxide solution. No binder is introduced into the slip. The mixing is carried out in a jar mill for 24 hours.

In stage b), the slip is cast, in a tray made of stainless steel, in the form of a sheet with a thickness equal to 4 cm.

In stage c), the sheet is frozen with a solidification front speed equal to 8 µm/s.

In stage e), the ice crystals are removed by sublimation, the frozen sheet being placed under a vacuum equal to 400 µbar and at a temperature equal to −20° C. The temperature is subsequently increased up to 40° C. in order to dry the agglomerates formed.

In stage g), the agglomerates obtained at the end of the preceding stage are ground in a model CB220 mill from Sodemi with a vibrating bowl internally comprising 2 moving bodies (a disk and a ring), so as to obtain an agglomerate powder exhibiting a median agglomerate size of between 3 and 50 µm.

The residual moisture content is equal to 0.6%.

In stage g), samples with a diameter equal to 30 mm and with a weight equal to 10 grams are sintered by SPS at 1850° C. for 5 minutes at a pressure of 40 MPa, with a rate of rise to 1850° C. equal to 100° C./min.

These SPS sintering treatments were carried out on a device of HPD 25/2 type from FCT Systeme GmbH. A vacuum of 10$^{-2}$ mbar is maintained inside the chamber. A series of pulses of direct current (the duration of the pulses is equal to 2 ms, the time between two pulses is 1 ms and, every 12 pulses, the system observes a pause equal to 6 ms, the current varies between 0 and 1720 A and the voltage varies between 0 and 6.7 V) is used. The temperature is measured using a pyrometer positioned along the pressing axis.

EXAMPLE 3

Comparative

The product of comparative example 3 is a silicon carbide product, comprising a secondary phase essentially comprising the elements Y, Al, Si and O, in a crystalline form. It is manufactured according to the following process:

In stage a), a slip is prepared by mixing:
2212 grams of water,
2205 grams of the silicon carbide powder described in example 2,
245 grams of the YAG powder described above. The total weight of the $Y_3Al_5O_{12}$ powder represents 10% of the total pulverulent weight (silicon carbide+$Y_3Al_5O_{12}$),
0.86 gram of the dispersant described above, i.e. 0.039% of the weight of the silicon carbide powder.

The solids content is equal to 50% of the weight of the slip. The pH of the slip was adjusted to 11.5 by an addition of 1M sodium hydroxide solution.

No binder was introduced into the slip.

The mixing was carried out in a jar mill for 24 hours.

Stages b) to e) are carried out in an identical fashion to example 2.

Preforms with dimensions of 80×80×12 mm³ are obtained by cold unidirectional pressing at a pressure equal to 60 MPa and are then sintered under argon, so as to obtain sintered parts, in the following cycle:

rise to 400° C. at a rate of 800° C./h,
rise from 400° C. to 1000° C. at a rate equal to 400° C./h,
rise from 1000° C. to 1775° C. at a rate equal to 230° C./h,
rise from 1775° C. to 1875° C. at a rate equal to 100° C./h,
stationary phase of 0.5 hour at 1875° C.,
descent with free cooling.

The characteristics and properties of the products obtained according to the preceding examples 1 to 3 are measured according to the following techniques:

The bulk density is measured by impregnation, according to the buoyancy principle.

The absolute density is measured by helium pycnometry on an AccuPyc 1330 appliance from Micromeretics® on a ground product powder exhibiting a maximum size of less than 160 μm.

After chemical attack targeted as revealing the grain boundaries, the mean size of the grains of the products of the examples is measured according to the intercept length method described in the standard ASTM E1382-97, or average intercept length, the results obtained by this standard being multiplied by a correcting coefficient equal to 1.56 in order to take into account the three-dimensional aspect. The chemical attack carried out consists in immersing the polished samples of mirror grade for 15 minutes in a mixture, brought to boiling point, of 60 ml of water, 17 g of potassium hexacyanoferrate and 20 g of potassium hydroxide.

The demonstration of a second phase at the grain boundaries was carried out by scanning electron microscopy, by transmission electron microscopy and with a microprobe.

The noncrystalline nature is determined by X-ray diffraction, confirmed by observations by transmission electron microscopy (TEM), as indicated above.

The X-ray diffraction analyses were carried out on an X'Pert PRO MPD appliance from PANalytical on $K\alpha_m$ and rapid detection configuration, over a 2θ angular range between 25° and 37°, by a step of 0.002°/s. The front optical system is composed of a 1° fixed divergence slit, a 0.04 rad Soller slit, a 10 mm mask and a 2° fixed anti-scatter slit. The sample is rotated about itself at a speed of 1 second per rotation, in order to enhance the counting statistics. The rear optical system is composed of a 1° fixed anti-scatter slit, a 0.04 rad Soller slit and a Ni filter. Before analysis by X-ray diffraction, the samples are ground in the form of a powder exhibiting a maximum size equal to 40 μm.

The hardness was measured from Vickers indentations (at 1 kg). After measuring the length of the radial cracks, the toughness was calculated by using the universal formula developed by Liang et al. (Evaluation by indentation of fracture toughness of ceramic materials, 1990).

The abrasion of the products of the examples is measured according to the standard ASTM G76-04, on samples having dimensions of 30×30 mm² with a thickness equal to 3 mm, using abrasive alumina particles projected onto said samples at a pressure of 24 psi, at a flow rate of 2 g/min and for a time equal to 15 minutes, with an angle of incidence, i.e. angle between the sample and the stream of alumina particles, equal to 90°. The value of the abrasion, or erosion value, is equal to the ratio of the volume of abraded material, that is to say of the loss in volume after the test, to the weight of abrasive used. The lower the value of this ratio, the better the abrasion resistance.

The main characteristics of the process and measurements carried out on the product obtained according to examples 1 to 3 are given in the following table 1:

TABLE 1

| | Example 1 (comparative) | Example 3 (comparative) | Example 2 (invention) |
|---|---|---|---|
| Amount of $Y_3Al_5O_{12}$ powder in the slip, as percentage by weight on the basis of the dry matter of the slip | 0 | 10 | 5 |
| Silicon carbide (% by weight) | >95% | >88% | >93% |
| Relative density (%) | 98.5 | 98.6 | 98.6 |
| Mean size of the grains (μm) | 6 | 3 | 0.5 |
| Presence of a secondary phase | Yes, in the form of inclusions | Yes, located at the grain boundaries | Yes, located at the grain boundaries |
| Nature of the secondary phase | Carbon and boron carbide | Comprises, for more than 99%, the elements Y, Al, Si and O | Comprises, for more than 99%, the elements Y, Al, Si and O |
| Structure of the secondary phase | Crystalline | Crystalline | Amorphous |
| Vickers hardness, measured at 1 kg (MPa) | 2430 | 2220 | 2390 |
| Toughness ($MPa \cdot m^{1/2}$) | 3 | 5.2 | 3.8 |
| Abrasion, measured at an angle of incidence equal to 90° ($mm^3/g$) | 0.29 | 0.33 | 0.02 |

As is shown in table 1, the abrasion, measured at an angle of incidence equal to 90°, is markedly lower for the product of example 2 according to the invention: it is equal to only 0.02 mm³/g, less than 0.29 and 0.33 mm³/g for the products of comparative examples 1 and 3.

Of course, the present invention is not limited to the embodiments described and represented, provided by way of example. In particular, combinations of the various embodiments described also come within the scope of the invention. Neither is the invention limited by the shape or the dimensions of the sintered product based on silicon carbide.

The invention claimed is:

1. A sintered product, consisting essentially of:
   more than 92% by weight of silicon carbide,
   between 0.5% and 8% by weight of an amorphous secondary phase comprising elements O, Si, and either or both of Al and Y, and
   less than 2% of other elements, present in the product as an additional phase or as unavoidable impurities,
   wherein the silicon carbide is present as crystalline grains having a mean size greater than 250 nanometers,
   wherein the sintered product has a relative density of greater than 97%, and
   wherein the secondary phase is amorphous and located essentially a boundaries of the silicon carbide grains.

2. The product as claimed in claim 1, wherein the mean size of the crystalline grains is less than 3 micrometers.

3. The product as claimed in claim 1, wherein an amount of amorphous secondary phase is greater than 2% and less than 7% of a weight of the product.

4. The product as claimed in claim 3, wherein the amount of amorphous secondary phase is greater than 3% and less than 6% of the weight of the product.

5. The product as claimed in claim 1, wherein the amorphous secondary phase comprises Al, Si, and O.

6. The product as claimed in claim 1, wherein the amorphous secondary phase comprises Y, Si, and O.

7. The product as claimed in claim 1, wherein the amorphous secondary phase comprises Y, Al, Si, and O.

8. The product as claimed in claim 1, wherein an overall content of other elements is less than 1%.

9. The product as claimed in claim 1, wherein a mean size of the grains is from greater than 250 nanometers to 1 micrometer.

10. The product as claimed in claim 1, wherein the relative density is greater than 98.5%.

11. The product as claimed in claim 1, wherein a number of free carbon inclusions between the silicon carbide grains on a surface area equal to 4 $\mu m^2$ is less than 2.

12. An abrasion-resistant protective part, comprising the product as claimed in claim 1, wherein the abrasion-resistant protective part is resistant to impact wear.

13. An installation, comprising:
    the sintered product as claimed in claim 1,
    wherein the installation is selected from the group consisting of a hopper, an item of equipment for transportation or conveying of granular or pulverulent solids, an item of equipment for comminution under dry conditions or in a wet medium, an item of equipment for particle size selection, a grinding bead, a fan blade, a dynamic or static particle size selector, a spray or injection nozzle, a rotor or stirrer for suspensions, a seal, a pump, a collar or a bearing of a rotating shaft, a valve, and a faucet.

14. A process for manufacturing the sintered product as claimed in claim 1, the process comprising, successively:
    preparing a slip comprising a solvent, a surface-active agent, optionally an acid and/or a base, and more than 4% by weight based on the slip of a mixture of powders comprising a silicon carbide powder and a powder of an oxide or precursor of an oxide of Al or Y or both,
    optionally casting the slip in a mold,
    freezing the slip, thereby forming a preform comprising ice crystals separated by walls, the walls comprising the mixture of silicon carbide powder and powder of the oxide or precursor, thereby obtaining a frozen slip,
    optionally withdrawing the frozen slip preform from the mold,
    removing the ice crystals from the frozen slip preform, optionally withdrawn from the mold, thereby obtaining an assembly of agglomerates,
    optionally grinding (breaking up) and/or sieving assembly of agglomerates, thereby obtaining a powder,
    sintering the powder by SPS (Spark Plasma Sintering and shaping the product thereby obtaining the product,
    wherein a median size of the particles of the silicon carbide powder is less than 2 µm, and
    a median size of the particles of the powder of the oxide or precursor is less than that of the silicon carbide powder.

15. The process as claimed in claim 14, wherein the powder of the oxide or precursor is a YAG ($Y_3Al_5O_{12}$) powder.

16. The process as claimed in claim 14, wherein the powder of the oxide or precursor is mixed with a silica powder or silica precursor powder, the median size of which is less than that of the silicon carbide powder.

17. The product as claimed in claim 1, wherein an amount of amorphous secondary phase is greater than 0.5% and less than 7% of a weight of the product.

18. The product as claimed in claim 1, wherein the amorphous secondary phase comprises an amorphous oxide.

19. The product as claimed in claim 1, wherein a mean size of the grains is from 0.5 micrometers to less than 3 micrometers.

* * * * *